Patented Sept. 13, 1932

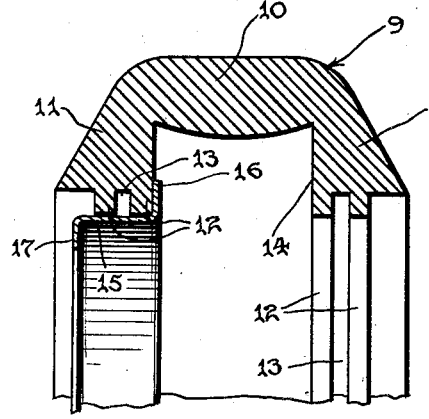
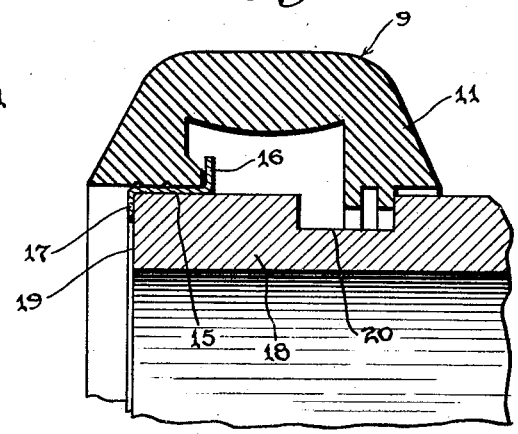
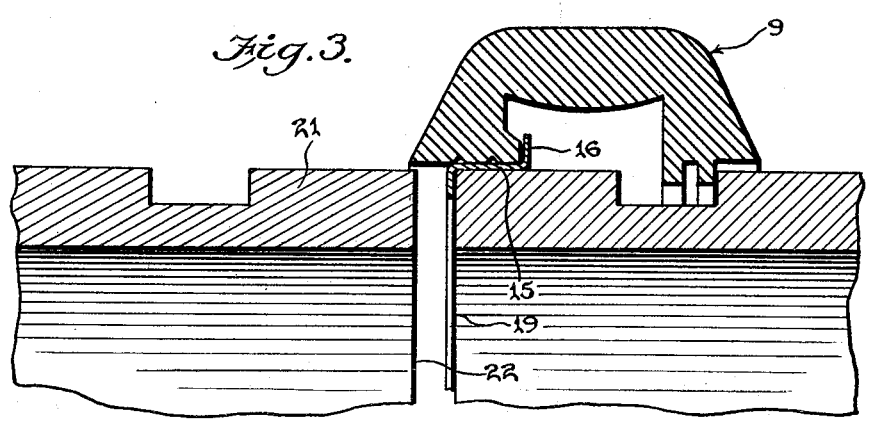
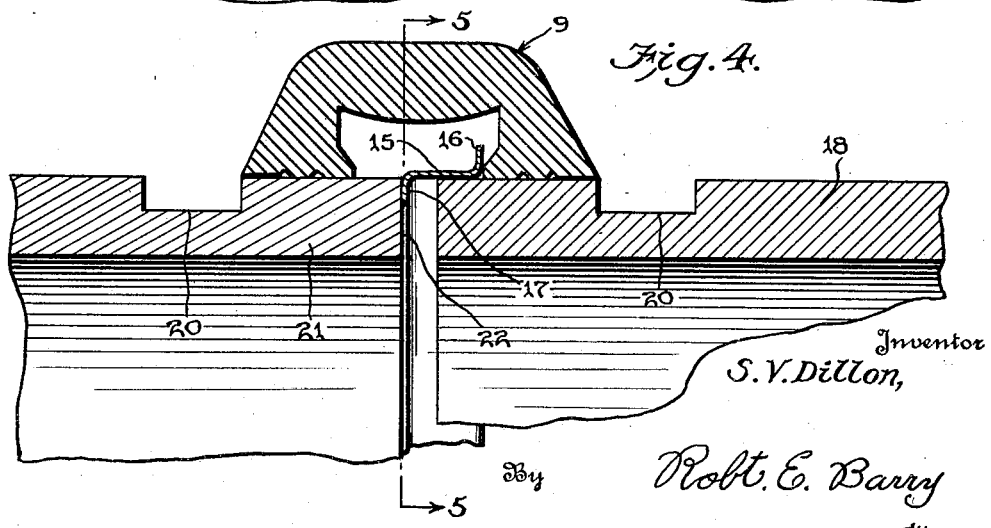

1,876,638

UNITED STATES PATENT OFFICE

STEPHEN V. DILLON, OF TULSA, OKLAHOMA, ASSIGNOR TO THE DILLON COMPANY, OF TULSA, OKLAHOMA, A CORPORATION OF OKLAHOMA

GUIDING MEANS FOR PIPE COUPLINGS

Application filed January 31, 1931. Serial No. 512,702.

This invention relates to improvements in packing gasket guides.

In pipe couplings of the type employing channel-shaped packing rings having an inner diameter shorter than the outer diameter of the pipes to be coupled, it frequently happens where the operators are careless, or the pipe ends cannot be seen, or where the pipes are not in alignment, that the packing ring will be improperly installed, and consequently, when the metal housing is applied and clamped over the packing ring, the latter will be cut, and this will result in leakage and necessitate rubber replacements.

The primary object of my invention is to provide a guiding means to be used with such packing rings and which will eliminate the above mentioned difficulties. Such guiding means is preferably in the form of a ring made of some suitable material such as metal and having an outwardly extending abutment or flange to extend into the channel of the packing ring, and an inwardly extending abutment or flange designed to cooperate with the extremities of the pipes to be coupled. Guiding means of this character obviates the objections heretofore mentioned and enables the operators to properly install the rubber packing rings by the sense of touch, where this is necessary due to poor light or concealment of a portion or all of the pipe ends.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 1 is a diametrical sectional view of a portion of a multi-seal packing ring and showing a portion of my elastic guide ring after the latter has been attached to the packing ring, and before the packing ring is placed over one of the pipe ends that is to be coupled to a similar pipe end.

Fig. 2 is a similar view but showing the position of the two rings after they have been placed on one of the pipe ends.

Fig. 3 is a view of the same kind showing the pipe ends ready for the packing ring to be moved over so as to bridge the space between said ends.

Fig. 4 is a similar view after the packing ring has been moved over into bridging position.

Figure 5:
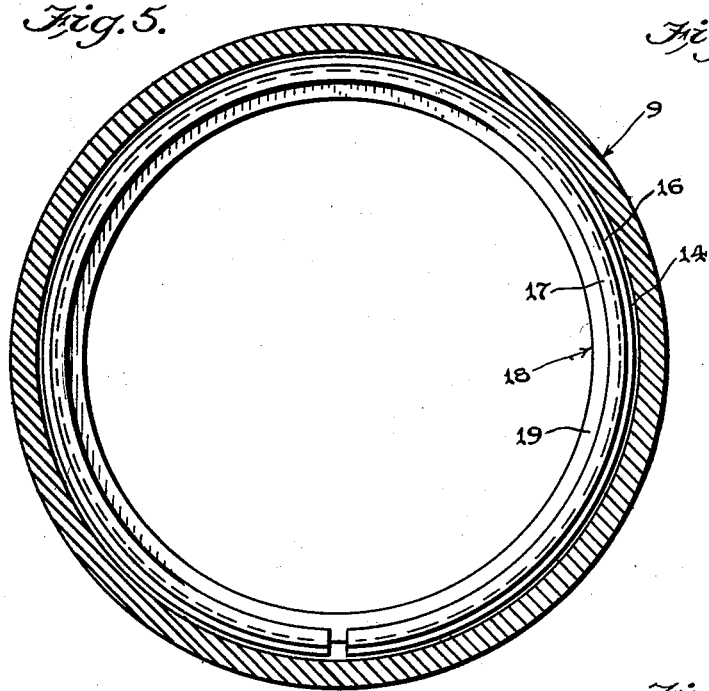
Fig. 5 is a transverse sectional view of the entire assembly, taken on the line 5—5 of Fig. 4.

Referring to the drawings, 9 designates a one-piece packing ring formed of any suitable elastic material such as rubber, and of channel-shaped radial section to provide an outer web 10 and inwardly extending annular flanges 11 which may terminate in inwardly extending annular beads or sub-flanges 12 that are spaced apart by annular grooves 13. The ring provides an annular groove 14.

The ring illustrated is of the special construction disclosed in one of my prior patent applications, but I desire it to be understood that my present invention may be used in combination with any channel-shaped packing ring having inwardly extending flanges.

Figure 6:
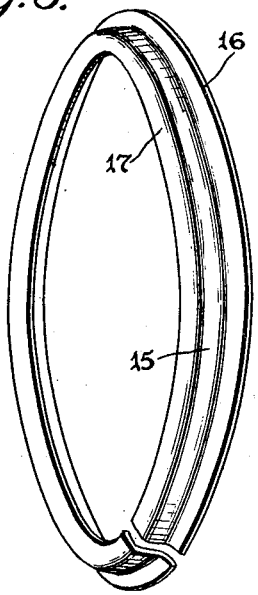
Fig. 6 is a perspective view of one form of my guide ring.
Figure 7:
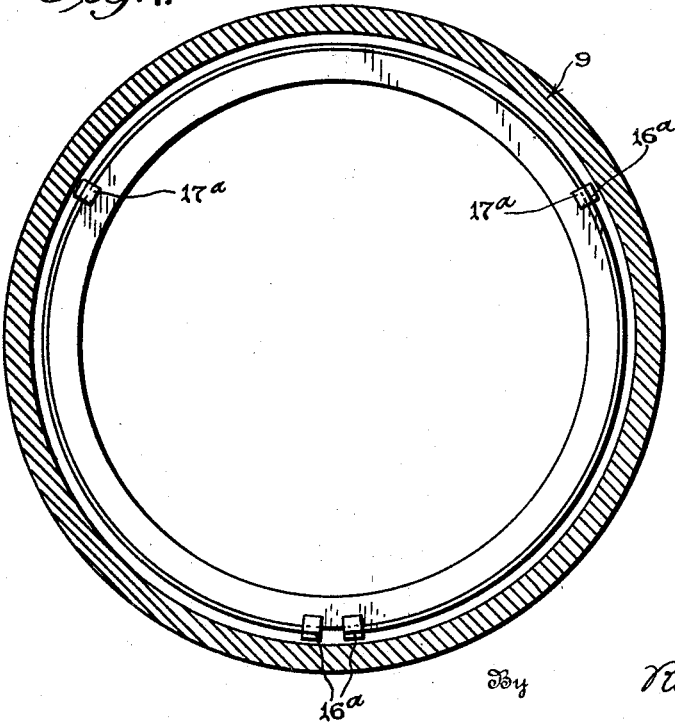
Fig. 7 is a view similar to Fig. 5, but showing a modified form of guide ring.
Figure 8:
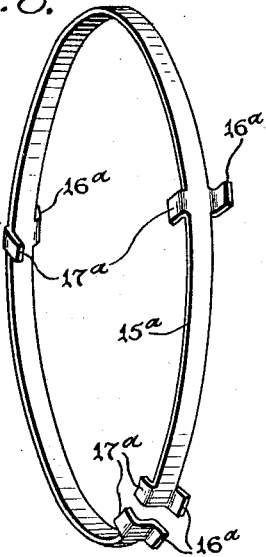
Fig. 8 is a perspective view of the type of guide ring used in Fig. 7.

The guiding means which I use in combination with such rings may be of the type illustrated in Fig. 6. Such guiding means comprises a cylindrical split body 15 of suitable resilient material such as spring metal, and provided at one end with an outwardly extending annular flange 16, and at its opposite end with an inwardly extending annular flange 17. The split formation of this guiding ring enables the ring to be contracted in order that its flange 16 may be introduced into the channel 14, as shown in Fig. 1, and now, when the packing ring 9 with the guiding ring attached thereto, is moved on to a pipe end 18 as shown in Fig. 2, the flange 17 will come into abutting relation with the extremity 19 of the pipe end, and consequently, the guide ring will be stopped at the desired place to limit further inward movement of the ring 9 on to the pipe end, or until the left flange in Fig. 2 comes into abutting relation with the flange 16. It will be observed that the sub-flanges 12 of the left flange 11 will be compressed by such movement, and if the coupling is of the type in which the pipe ends are grooved, as shown at 20, the sub-flanges 12 of the right flange 11 will move into the groove 20.

After the packing ring and guide ring have been placed on one of the pipe ends and occupy the positions shown in Fig. 2, the other pipe end 21 may be placed in close proximity to the pipe 18, as illustrated in Fig. 3, and any suitable means, not shown, may be placed between the adjacent surfaces 19 and 22 to space the pipe ends. Now, if the packing ring 9 is moved toward the left in Fig. 3, the guide ring will transfer the left flange 11 on to the pipe end 21, and the operator will continue to move the ring 9 until its right flange 11 abuts against the flange 16, at which time the right flange 11 will act to move the guiding ring until its flange 17 abuts against the surface 22 of the other pipe, as shown in Fig. 4.

It will be appreciated from the foregoing that the guiding means is such as to enable the operator to "feel" the packing ring going into place, and consequently, the ring will be properly installed even though it is necessary to make the connection without sufficient light, under water or on swampy ground. As the packing ring will always be accurately installed in this way; when the metal clamping housing, not shown, is attached so as to enclose the packing ring and extend into the grooves 20, such housing will act simply to compress the packing ring without liability of biting into the same and thereby injuring the packing ring and causing leakage.

In couplings of the type illustrated, the fluid traversing the pipe line enters the channel 14, and due to the split formation of my guide ring, there will be no interference to such entry.

It is manifest that the guiding means may be made in other forms than that shown in Fig. 6. For example, instead of employing the annular flanges 16 and 17, these flanges may be replaced by suitably spaced tongues 16a and 17a which project respectively outwardly and inwardly from the body 15a of the split guiding ring.

While guiding means of the kind disclosed is absolutely essential for use with plain end pipe couplings, I have found that it is imperative for the correct installation of grooved end pipe couplings. In actual practice, where a line was being installed in swampy ground, it was impossible for the men to see whether the rubber was correctly lined up or not, and this would have resulted in faulty installation, had not the improved guiding means been used. By using guides of this type, the workmen could feel if the rubber was moved up against the flange of the packing ring, and thereby know that they had installed it straight, and that part of the rubber was not in the groove, that is, in position to be cut by the metal housing when the latter was installed.

By using a guide of this type and exerting a positive hand pressure around the packing ring, a workman can tell by the physical force applied and by the sense of touch, whether or not the rubber aligned by the guide ring is installed correct and straight.

From the foregoing it is believed that the construction, operation and advantages of the invention may be readily understood, and I am aware that changes may be made in the details disclosed, without departing from the spirit of the invention, as expressed in the claims.

What I claim and desire to secure by Letters Patent is:

1. The combination with adjacent pipe ends having spaced apart extremities and a channel-shaped packing ring bridging the space between said extremities, of a guide ring having an outwardly extending abutment projecting into the channel of the packing ring, and an inwardly extending abutment projecting into the space between the extremities of the pipes.

2. The combination with adjacent pipe ends having spaced apart extremities and a channel-shaped packing ring bridging the space between said extremities, of a guide ring formed of resilient material and having an outwardly extending abutment projecting into the channel of the packing ring, and an inwardly extending abutment projecting into the space between the extremities of the pipes, said guide ring being radially split to permit it to be contracted for inserting the outwardly extending abutment into said channel.

3. The combination with adjacent pipe ends having spaced apart extremities, and a channel-shaped elastic rubber packing ring bridging the space between said extremities and having portions outwardly compressed by said pipe ends, of a guide ring having an outwardly extending abutment projecting into the channel of the packing ring, and an inwardly extending abutment projecting into the space between the extremities of the pipes, said guide ring being formed of resilient material by having sufficient stiffness to self-sustain its ring shape.

4. The combination with adjacent pipe ends having spaced apart extremities and a channel-shaped packing ring bridging the space between said extremities, of a metallic resilient guide ring having an outwardly extending abutment projecting into the channel of the packing ring, and an inwardly extending abutment projecting into the space between the extremities of the pipes, said guide ring being radially split to permit it to be contracted for inserting the outwardly extending abutment into said channel.

5. The combination with adjacent pipe ends having spaced apart extremities and a channel-shaped packing ring bridging the space between said extremities and resting on the outer surfaces of said pipe ends, of a guide ring slidably mounted on one of said pipe ends and having an outwardly extending abutment projecting into the channel of the packing ring, and an inwardly extending abutment projecting into the space between the extremities of the pipes, said guide ring being radially split and formed of resilient metal.

6. The combination with adjacent pipe ends having spaced apart extremities and a channel-shaped packing ring bridging the space between said extremities, of a guide ring having an outwardly extending abutment projecting into the channel of the packing ring, and an inwardly extending abutment projecting into the space between the extremities of the pipes, one of said abutments being of substantially annular formation.

7. The combination with adjacent pipe ends having spaced apart extremities and a channel-shaped packing ring bridging the space between said extremities, of a guide ring having an outwardly extending abutment projecting into the channel of the packing ring, and an inwardly extending abutment projecting into the space between the extremities of the pipes, said abutments being of substantially annular formation.

8. The combination with adjacent pipe ends having spaced apart extremities and a channel-shaped elastic rubber packing ring bridging the space between and gripping the outer surfaces of said extremities, of a guide ring capable of expanding and contracting and having an outwardly extending abutment projecting into the channel of the packing ring, and an inwardly extending abutment forming part of the guide ring and projecting into the space between the extremities of the pipes, one of said abutments being formed of spaced tongues.

9. The combination with adjacent pipe ends having spaced apart extremities and a channel-shaped packing ring bridging the space between said extremities, of a guide ring having an outwardly extending abutment projecting into the channel of the packing ring, and an inwardly extending abutment projecting into the space between the extremities of the pipes, said guide ring being radially split and formed of resilient material, and each of said abutments being of substantially annular formation.

10. The combination with adjacent pipe ends having spaced apart extremities and a channel-shaped packing ring bridging the space between said extremities, of a guide ring having an outwardly extending abutment projecting into the channel of the packing ring, and an inwardly extending abutment projecting into the space between the extremities of the pipes, said guide ring being radially split and formed of resilient metal, and each of said abutments being of substantially annular formation.

11. Guiding means for use in coupling pipes, comprising a resilient split metallic ring including a cylindrical web provided at one end with an outwardly extending abutment and at its opposite end with an inwardly extending abutment, said abutments being arranged at right angles to the web extending substantial distances from the web and terminating in edges at the ends of the ring, and the ring having sufficient rigidity to self-sustain its ring form.

As testimony whereof, I hereto affix my signature.

STEPHEN V. DILLON.